United States Patent
Kumada

[11] 3,838,906
[45] Oct. 1, 1974

[54] OPTICAL SWITCH
[75] Inventor: Akio Kumada, Kokubunji, Japan
[73] Assignee: Hitachi, Ltd., Tokyo, Japan
[22] Filed: Sept. 15, 1972
[21] Appl. No.: 289,255

[30] Foreign Application Priority Data
Sept. 18, 1971   Japan.................................. 46-72849

[52] U.S. Cl................................. 350/150, 350/157
[51] Int. Cl......................... G02b 27/28, G02f 1/26
[58] Field of Search............................ 350/150, 157

[56] References Cited
UNITED STATES PATENTS

| | | | |
|---|---|---|---|
| 2,705,903 | 4/1955 | Marshall | 350/150 |
| 3,559,185 | 1/1971 | Burns et al. | 350/157 X |
| 3,614,754 | 10/1971 | Cummins | 350/150 X |
| 3,661,442 | 5/1972 | Kumada et al. | 350/150 |

*Primary Examiner*—John K. Corbin
*Attorney, Agent, or Firm*—Craig & Antonelli

[57] ABSTRACT

An optical switch comprising an electro-optical crystal having optically positive or negative birefringency, a birefringent crystal having optically negative or positive birefringency and an electric power source connected with the electro-optical crystal for turning on and off the crystal, the electro-optical crystal and the birefringent crystal being arranged in cascade in such a manner that the sign of the birefringency of the former may be opposite to that of the latter, whereby the optical switch can effectively block an incident light having an incident angle as large as 30°, as is hardly possible with a conventional optical control device.

7 Claims, 10 Drawing Figures

OPTICAL SWITCH

BACKGROUND OF THE INVENTION

Field of the Invention

The present invention relates to an optical switch well adapted for incident lights having a wide variety of incident angles.

In this specification, by the term "optical switch" is meant an element to control by external signals the quantity, hue, wavelength, phase, plane of polarization and phase difference of the light passing through the element. Therefore, such devices as an optical shutter, a light modulator, a hue modulator, and switching means for rotating the plane of polarization etc. all belong to the optical switch under consideration.

The Kerr cell is known as an optical switching means utilizing a certain electro-optical effect. The Kerr cell is a transparent vessel filled with nitrobenzene, with a pair of electrodes separated from each other and immersed in the nitrobenzene and with a voltage of several tens of kilovolts applied between the electrodes. In order to use the Kerr cell as an optical switch, it is necessary for the cell to be placed between a pair of polarizers arranged in the orthogonal nicol configuration so that the linearly polarized light filtered through the one polarizer may be passed through the Kerr cell and reach the other polarizer. Since in this optical switch the nitrobenzene is optically isotropic in the absence of a voltage applied between the electrodes, the linearly polarized light leaving the one polarizer remains intact through the Kerr cell so that it is completely blocked by the other polarizer, i.e. analyzer, arranged in orthogonal relation to the first mentioned polarizer. Therefore, the quantity of the transmitted light will be zero. When a suitable voltage is applied between the electrodes immersed in the nitrobenzene, the birefringent or double refraction property is created due to the applied field. Accordingly, the linearly polarized light entering the Kerr cell is divided into birefringent components having phase differences during its travel through the cell and the birefringent components leaving the cell result in an elliptically polarized light. Therefore, with the Kerr cell energized by the applied voltage, the quantity of light passing through the analyzer will not be zero, that is, some quantity of linearly polarized light will pass through the analyzer. The quantity of the transmitted linearly polarized light varies with the amplitude of the voltage applied to the cell and takes its maximum value for an appropriate voltage, i.e. voltage which causes the direction of polarization of the incident linearly polarized light to rotate through 90° (referred to as a half-wavelength voltage). The phase difference between the transmitted birefringent components is in proportion to the light path difference which is determined by the product of $\Delta n$ and $d$, where $\Delta n$ is the difference between the indices of double refraction of the cell and $d$ is the distance of transmission (phase difference $= (2\pi/\lambda) \Delta n . d$).

Therefore, if the incident light is not a parallel beam, but a diverging or converging one, the quantity of the transmitted light varies according to the magnitude of the angle of divergence or convergence. The most important problem in the design of an optical switch is that of light leakage when the optical switch is in its "off" state, that is, it is blocking light. When nitroglycerine is used as a liquid for the Kerr cell, no light leakage takes place since the liquid becomes isotropic in the off state, as is described above.

The electro-optical effect of nitroglycerine is not very large and the operational voltage required in a practical case must be quite high. In order to lower the operational voltage, a material having a great electro-optical effect must be used for the Kerr cell. For this reason, there have been developed a lot of electro-optical crystals. In the following table are shown typical electro-optical crystals, with their symmetry, linear electro-optical coefficient (Pockels effect), refractive indices and half-wavelength voltages.

Table 1

| Crystal | Symmetry | Linear Electro-Optic Coefficient $\times 10^{-12}$ (m/V) | Refractive Index | Half-Wavelength Voltage | | |
|---|---|---|---|---|---|---|
| | | | | V $\lambda/2$ (KV) | Direction of Electric Field | Direction of Incident Light |
| CuCl | $\bar{4}3m$ | $r_{41}^{(T)}=6.1$ ($\lambda=0.535\mu$) | $n_0=1.996$ ($\lambda=0.535\mu$) | 5.8 ($\lambda=20.5\mu$) | [001] | [001] |
| CuBr | $\bar{4}3m$ | $r_{41}^{(T)}=0.85$ ($\lambda=0.535\mu$) | $n_0=2.16$ ($\lambda=0.5\mu$) | 32.1 | [001] | [001] |
| ZnTe | $\bar{4}3m$ | $r_{41}^{(T)}=4.55$ ($\lambda=0.57\mu$) | $n_0=3.1$ ($\lambda=0.6\mu$) | 3.4 | [001] | [001] |
| ZnSe | $\bar{4}3m$ | $r_{41}^{(T)}=2.0$ ($\lambda=0.5\mu$) | $n_0=2.66$ ($\lambda=0.5\mu$) | 7.8 | [001] | [001] |
| ZnS | $\bar{4}3m$ | $r_{41}^{(T)}=1.2$ ($\lambda=0.45\mu$) $r_{41}^{(T)}=2.0\sim2.1$ ($\lambda=0.6\mu$) | $n_0=2.471$ ($\lambda=0.40\mu$) $n_0=2.364$ ($\lambda=0.6\mu$) | 10.4 ($\lambda=0.45\mu$) | [001] | [001] |
| GaAs | $\bar{4}3m$ | $r_{41}^{(T)}=0.27\sim1.2$ ($\lambda=1\sim1.8\mu$) | $n_0=3.60$ ($\lambda=0.90\mu$) $n_0=3.42$ ($\lambda=1.25\mu$) | 13.3 ($\lambda=1\mu$) | [001] | [001] |
| GaP | $\bar{4}3m$ | $r_{41}^{(T)}=1.06$ ($\lambda=0.6\mu$) | $n_0=3.315$ ($\lambda=0.54\mu$) | 7.6 | [001] | [001] |
| $N_4(CH_3)_4$ | $\bar{4}3m$ | $r_{41}^{(T)}=4.2$ ($\lambda=0.6\mu$) | $n_0=1.59$ ($\lambda=0.6\mu$) $n_0=2.1$ | 15 27 | [001] | [001] |

Table 1—Continued

| Crystal | | Symmetry | Linear Electro-Optic Coefficient $\times 10^{-12}$ (m/V) | Refractive Index | Half-Wavelength Voltage $V_{\pi/2}$ (KV) | Direction of Electric Field | Direction of Incident Light |
|---|---|---|---|---|---|---|---|
| $Bi_4(GeO_4)_3$ | | $\bar{4}3m$ | $r_{41}^{(T)}=1.03$ | | | [001] | [001] |
| | | | $r_{41}^{(T)}=8.6$ | ($\lambda=0.6\mu$) $n_0=1.51$ | ($\lambda=0.6\mu$) | | |
| $KH_2PO_4$(KDP) | | $\bar{4}2m$ | $r_{63}^{(T)}=-10.5$ | $n_e=1.47$ | 7.5 | [001] | [001] |
| | | | $r_{63}^{(s)}=-9.7$ | ($\lambda=0.546\mu$) | ($\lambda=0.5\mu$) | | |
| $KD_2PO_4$(DKPP) | | $\bar{4}2m$ | $r_{41}^{(T)}=8.8$ | $n_0=1.51$ | 3.0 | [001] | [001] |
| [90% substitution] | | | $r_{63}^{(T)}=26.4$ | $n_e=1.47$ ($\lambda=0.546\mu$) | ($\lambda=0.5\mu$) | | |
| $NH_4H_2PO_4$(ADP) | | $\bar{4}2m$ | $r_{41}^{(T)}=24.5$ | $n_0=1.53$ | 9.0 | [001] | [001] |
| | | | $r_{63}^{(T)}=-8.5$ | $n_e=1.48$ | ($\lambda=0.5\mu$) | | |
| | | | $r_{63}^{(s)}=-5.5$ | ($\lambda=0.546\mu$) | | | |
| $KH_2AsO_4$(KDA) | | $\bar{4}2m$ | $r_{41}^{(T)}=12.5$ | $n_0=1.57$ | 6.4 | [001] | [001] |
| | | | $r_{63}^{(T)}=10.9$ | $n_e=1.52$ ($\lambda=0.546\mu$) | ($\lambda=0.5\mu$) | | |
| $RbH_2AsO_4$(RDA) | | $\bar{4}2m$ | $r_{63}^{(T)}=13.0$ | $n_0=1.56$ $n_e=1.52$ ($\lambda=0.546\mu$) | | | |
| $BaTiO_3$ [$T<T_c$] | | 4mm | $r_{42}^{(T)}=1640$ | $n_0=2.44$ | 0.4 | [001] | [010] |
| | | | $r_{42}^{(s)}=820$ | $n_e=2.37$ ($\lambda=0.546\mu$) | ($l/d=1$) | | |
| | | | $(r_{33}-r_{13})^{(T)}=108$ | | | | |
| $KTa_{0.65}Nb_{0.35}O_3$ (KTN) [$T<T_c$] | | 4mm | $(r_{33}-r_{13})^{(T)}=500$ | $n_0=2.318$ | 0.11 | [001] | [010] |
| | | | $r_{42}^{(T)}=16000$ | $n_e=2.27$ ($\lambda=0.546\mu$) | ($l/d=1$) | | |
| $K_{0.6}Li_{0.4}NbO_3$ | | 4mm | $(n_e^3 r_{33}-n_0^3 r_{13})^T=680$ | $n_0=2.277$ $n_e=2.163$ ($\lambda=0.633\mu$) | 0.93 ($l/d=1$) | [001] | [010] |
| $KSr_2Nb_5O_{15}$ | | 4mm | $[r_{33}-(n_0/n_e)^3 r_{13}]^{(T)}=130$ | $n_0 \approx n_e = 2.25$ ($\lambda=0.633\mu$) | 0.43 ($l/d=1$) | [001] | [010] |
| $Sr_xBa_{(1-x)}Nb_2O_6$ | x=0.75 | 4mm | $(r_{33}-r_{13})^{(s)}=1070$ | $n_0=2.3117$ $n_e=2.2987$ ($\lambda=0.633\mu$) | 0.048 ($l/d=1$) | [001] | [010] |
| | x=0.50 | 4mm | $(r_{33}-r_{13})^{(s)}=90$ | $n_0=2.3123$ $n_e=2.2734$ ($\lambda=0.633\mu$) | 0.58 ($l/d=1$) | [001] | [010] |
| $0<x<1$ | x=0.25 | 4mm | $(r_{33}-r_{13})^{(s)}=41$ | $n_0=2.3144$ $n_e=2.2596$ ($\lambda=0.633\mu$) | 1.24 ($l/d=1$) | [001] | [010] |
| $Ba_2NaNb_5O_{15}$ | | 4mm | $(n_e^3 r_{33}-n_0^3 r_{13})=370$ | $n_0=2.32$ $n_e=2.22$ ($\lambda=0.633\mu$) | 1.72 ($l/d=1$) | [001] | [010] |
| $LiNbO_3$ | | 3m | $r_{13}^{(s)}=8.6$ $r_{33}^{(s)}=30.8$ $r_{51}^{(s)}=r_{42}^{(s)}=28$ $r_{22}^{(s)}=3.4$ $r_{22}^{(T)}=7$ $r_{13}=7$ | $n_0=2.286$ $n_e=2.200$ ($\lambda=0.633\mu$) | 2.9 ($l/d=1$) | [001] | [100] |
| $LiTaO_3$ | | 3m | $r_{33}^{(s)}=30.3$ $r_{51}^{(s)}=r_{42}^{(s)}=20$ | $n_0=2.176$ $n_e=2.180$ ($\lambda=0.633\mu$) | 2.8 ($l/d=1$) | [001] | [100] |

In the column of the linear electro-optical coefficients in the above table, the r values having no superscripts are those measured at room temperatures while the r values having superscripts (s) and (T) are those measured at constant strain and constant stress, respectively.

Where there is no wavelength specified, it is implicitly meant that the allotted wavelength is within a range of 0.5 to 0.6 $\mu$, i.e. $\lambda = 0.5$–$0.6$ $\mu$.

The half-wavelength voltage for each electro-optic crystal takes different values according to the applied voltage and the direction of the incident light change (it should be noted that the directions adopted in this table are arbitrarily selected and not necessarily optimal ones).

The character $l$ designates the length of the crystal along which light is propagated and $d$ indicates the thickness of the crystal across which the electric field is applied.

It is by the use of the equiaxial or isotropic crystals belonging to the point group $\overline{4}3m$ (where $\overline{4}$ indicates 4 fold rotation inversion axis, 3 denotes 3 fold axis and $m$ designates mirror plane) as an electro-optical crystal in the optical switching element that the element can be turned "off" independent of incident angle of light directed into the electro-optical crystal. In order for the optical switching element to be turned "on" in the visible range of electromagnetic radiation, the half-wavelength voltage $V_2^\lambda$ to be applied to the electro-optical crystal must be comparatively high, e.g. about 10 KV.

The ferroelectric crystal has a comparatively large electro-optical effect and the half-wavelength voltage thereof is low. For example, a $KD_2PO_4$ crystal belonging to the point group $\overline{4}2m$ (where the symbols $\overline{4}$, 2 and $m$ designate 4-fold rotation inversion axis, 2-fold axis and mirror plane, respectively) has a half-wavelength voltage $V/_2^\lambda = 3$ KV; an $LiNbO_3$ crystal belonging to the point group $3m$ (where the symbols 3 and $m$ designate 3 fold axis and mirror plane) has $V/_2^\lambda = 2.9$ KV while an $LiTaO_3$ crystal belonging to the point group $3m$ has $V/_2^\lambda = 2.8$ KV. Each of these crystals can be easily grown to a homogeneous, large bulk and is used as an electro-optical crystal.

Some of the crystals belonging to the point group $4mm$ (4: 4 fold axis, $mm$: two mirror planes) including, for example, $BaTiO_3$ have even large electro-optic effects, for example, $BaTiO_3$ has $V/_2^\lambda = 0.4$ KV and for its solid solution the $V/_2^\lambda$ can be reduced; $V/_2^\lambda = 0.048$ KV for $Sr_{75}Ba_{25}Nb_2O_6$. It is, however, difficult for each of these crystals to be grown to a large, optically homogeneous bulk and these have not come to be used in practical applications, and a great deal of effort has been directed toward the development of the technique for growing a large, homogeneous crystal.

KDP crystals of point group $\overline{4}2m$, $LiNbO_3$ crystals of $3m$ and $BaTiO_3$ crystals of $4mm$ are all monoaxial crystals but not isotropic ones. Accordingly, light leakage at the time of shutting-off exhibits a large dependency upon the angle of incidence of the impinging light.

Besides the isotropic and the monoaxial electro-optical crystals mentioned above, the biaxial crystals such as $Gd_2(MoO_4)_3$ have also been developed (the biaxial property appears only at temperatures below 160°C).

In a $Gd_2(MoO_4)_3$ crystal and its family at temperatures below their Curie points, the birefringency or double refraction $\Delta n$ exhibits a hysteresis characteristic and the property can be utilized as a memory effect. Namely, unless a voltage higher than a certain threshold is applied, the initially assumed $\Delta n$ is preserved. Accordingly, by using such crystals can be provided an optical switch having a memory effect.

As will be later described in this specification, the c plate of a $Gd_2(MoO_4)_3$ single crystal, which is obtained by cutting the crystal along the direction perpendicular to the $c$ axis and then polishing it to have a thickness of 387 $\mu$, can serve as a quarter-wave or $\lambda/4$ plate. A pair of transparent electrodes are disposed on the front and rear faces of the plate. If a voltage of about 200 volts is applied between the electrodes, the sign of the birefringency will be changed. If one quarter-wave plate is stacked upon another in diagonal relationship to each other, the retardation R of light passing through them will be such that $R = \frac{1}{4} \pm \frac{1}{4} = \frac{1}{2}$ or 0. Therefore, the combination of them with a polarizer plate can constitute an optical shutter for monochromatic light. If a $\lambda/4$ plate formed on the basis of the center wavelength $\lambda_0 = 535$ m$\mu$ of white light is placed in the path of the white light, the transmitted light will be almost colorless and the shutting-off of light can be done independent of wavelengths when desired. When the $\lambda/4$ plate combined with a $Gd_2(MoO_4)_3$ single crystal is replaced by a double refractive plate having a large value of retardation R, that is, a combination of a quartz X plate having a thickness of about 100 $\mu$ and two $Gd_2(MoO_4)_3$ c-plates respectively having thicknesses of 210 $\mu$ and 190 $\mu$ and stacked upon the quartz X plate is placed between a pair of polarizer plates in diagonal relationship, the resultant retardation R will increase and the interference color will also appear. For a light shutter constructed in a similar manner with a voltage of about 150 volts applied between two crystal plates similar to the c-plate, the resultant retardation $\Gamma$ is given by the following expression $$\Gamma = \Gamma_0 \pm \Gamma_I \pm \Gamma_{II}$$

where $\Gamma_0$, $\Gamma_I$ and $\Gamma_{II}$ are values of retardations for quartz, $Gd_2(MoO_4)_3$ crystals I and II, respectively. As a result of this the resultant retardation $\Gamma$ takes values of 950 m$\mu$, 1113 $\mu$ and 1313 $\mu$ and if the values are appropriately chosen to be 950 $\mu$, 1138 $\mu$ and 1313 $\mu$ which produce red, blue and green light as a result of interference, a hue modulating element will be realized which can change the hue of transmitted light in response to the applied voltage.

In the above mentioned light shutter, the leakage of light increases when the incident light deviates from the c axis of $Gd_2(MoO_4)_3$ crystal so that the contrast between ON and OFF is deteriorated. On the other hand, in the light control element for hue modulation, not only color purity is degraded but also wrong colors are often produced.

Therefore, when a $Gd_2(MoO_4)_3$ crystal as well as $KH_2PO_4$, $BaTiO_3$ and $LiNbO_3$ crystals is used as an electro-optic element, a limit is set to the angle of incidence of the incident light, that is, the limit to the angle is about 3°.

As described above, when an isotropic electro-optic crystal is used, there is no light leakage in the OFF state while the electro-optical effect due to the application of a voltage is not sufficient. If, on the other hand, the crystal having a large electro-optical effect, whether it is monoaxial or biaxial, is used, the tolerant angle of incidence is to be limited to a certain degree. A device for processing pictures, such as a camera, must have a picture angle of at least ± 30°.

SUMMARY OF THE INVENTION

The object of the present invention is to provide an optical switch or light control element which can satisfactorily treat impinging light beams whose angles of incidence are in rather a wide range, that is, which has a large tolerance angle to the obliquely impinging light.

The tolerance angle to the obliquely impinging light is the extreme angle of incidence of the obliquely impinging light at which the impinging light can be completely blacked.

According to the present invention, there is provided an optical switch comprising an electro-optical crystal and a birefringent crystal arranged in cascade and voltage application means connected with the electro-optical crystal for the application of a predetermined voltage thereto, wherein the signs of birefringency of the electro-optical crystal and the birefringent crystal are opposite to each other, that is, if the sign of the former is positive, that of the latter is negative and if the sign of the former is negative, that of the latter is positive. When it is desired to use the optical switch in a practical application, it must be placed between a pair of polarizer plates arranged in orthogonal or crossed polar relation to each other.

Moreover, the following conditions are required for the fulfillment of the object of the present invention:

1. If the electro-optical crystal used in the optical switch is monoaxial, the light impinging upon the crystal along its optical axis (generally along the c axis) is singly refracted while the light oblique to the c axis is double-refracted so that some of the obliquely impinging light will leak out of the optical switch even when it is turned off. In order to eliminate such a leakage of light, it is necessary to compensate for the phase difference (and therefore light path difference) due to the double refraction, which causes the leakage of light. For this purpose, in series with the above described monoaxial electro-optical crystal is arranged an additional monoaxial electro-optical crystal which has a refractive index and a refractive difference, i.e. the difference between the two refractive indices due to the birefringency of the crystal, equal in value but opposite in polarity to the main crystal. With this arrangement, the retardation $\Gamma_1$ of an obliquely impinging light (having an angle of $\theta$ with respect to the c axis) for the main crystal is such that $$\Gamma_1 = (2\pi/\lambda)\Delta n(\theta)d(\theta),$$

while the retardation $\Gamma_2$ defined in the same manner with respect to the additional crystal is such that $$\Gamma_2 = - (2\pi/\lambda) \Delta n(\theta)d(\theta).$$

Hence, it follows that $$\Gamma_1 + \Gamma_2 = 0.$$

Namely, it is stated that the resultant retardation, i.e. the sum of the retardations $\Gamma_1$ and $\Gamma_2$, vanishes irrespective of the angle $\theta$ of incidence. This means that the leakage of light due to the obliquely impinging light is eliminated. Moreoever, even if the refractive index and the refractive difference of the main crystal is not equal in value to those of the additional crystal, the resulting retardation can be rendered zero by appropriately choosing the refractive indices and the refractive difference of both the crystals such that $$\Delta n_1/n_1^2 = \Delta n_2/n_2^2$$

(1).

where $n_1$ and $\Delta n_1$ are the refractive index and the refractive difference of the main crystal and $n_2$ and $\Delta n_2$ are those of the additional crystal. 2. In case where the electro-optical crystal used in the optical switch is biaxial, let it be assumed that the angles between the optical axes and the refractive indices of the main crystal and an additional compensatory, birefringent crystal are $2V_1$, $2V_2$ and $n_1$, $n_2$, respectively and that the main crystal and the additional crystal are both birefringent ones, each having positive or negative birefringency and the signs of the birefringencies of both the crystals being opposite to each other. Then, it follows that $$\left. \begin{array}{c} V_1 \cdot n_1 = V_2 \cdot n_2 \\ \Delta n_1 \cdot d_1 = \Delta n_2 \cdot d_2 \end{array} \right\}$$

(2).

Hence, the resulting synthesized retardation vanishes in this case, too. It should here be noted that the biaxial negative crystal is a biaxial crystal having an ellipsoid of refractive index defined by an inequality $n_b > n_a > n_c$ while the biaxial positive crystal is a biaxial crystal having an ellipsoid of refractive index defined by an inequality $n_c > n_a > n_b$, where $n_a$, $n_b$ and $n_c$ are refractive indices of lights having planes of polarization along the crystallographic a, b and c axis, respectively.

DESCRIPTION OF THE PREFERRED EMBODIMENT

Embodiment 1

A $KD_2PO_4$ single crystal is so cut perpendicular to the c axis as to form a c-plate having a thickness of 5 mm. The c planes of the c-plate are then polished to have a degree of flatness less than $\lambda/10$. Indium is vapor-deposited on the polished surfaces in an atmosphere of oxygen at $10^{-3}$ mmHg and the oxidation of the coated indium is performed through glow discharge to form transparent electrodes of $In_2O_3$.

Figure 1:
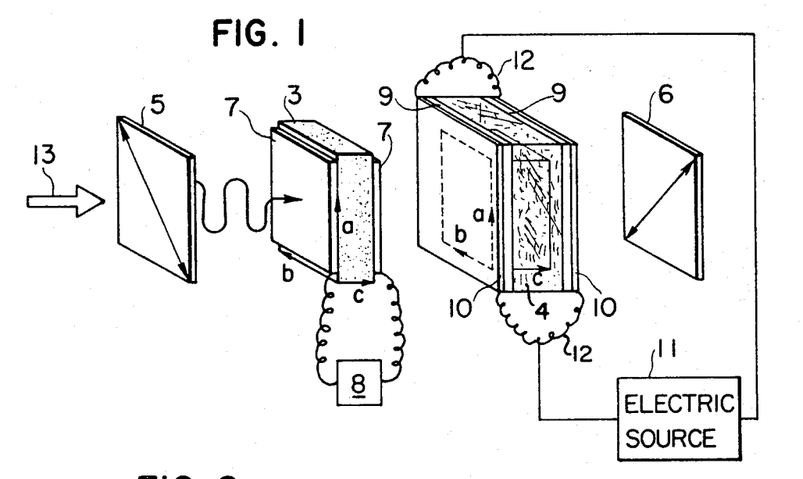
FIG. 1 schematically shows one embodiment of the present invention in which the optical switch is made a $KD_2PO_4$ crystal and $Gd_2(MoO_4)_3$ crystal plate heated to temperatures above its Curie point.

FIG. 1 shows a cascade arrangement of the thus formed c-plate 3 of $KD_2PO_4$ having a pair of transparent electrodes and a c-plate 4 of $Gd_2(MoO_4)_3$ having a thickness of 5 mm and kept at temperatures above 160°C. In FIG. 1, a polarizer 5 and an analyzer 6 are arranged in orthogonal relation to each other. $In_2O_3$ films 7 are on the c planes of the $KD_2PO_4$ plate 3 and a power supply 8 applies a voltage between the $In_2O_3$ films serving as electrodes 7. Nesa glass plates 9 have transparent electrodes 10 composed mainly of $SnO_2$ disposed thereon and a power source 11 is connected through lead wires 12 with the transparent electrodes.

In the above described structure, i.e. system, a voltage of several tens of volts from the power source 11 is applied to the transparent electrodes 10 and the c-plate 4 of $Gd_2(MoO_4)_3$ crystal is maintained at about 170°C due to Joule heat produced by the application of the voltage to the electrodes 12. The most remarkable feature of this system is that if the voltage applied to the c-plate 3 of $KD_2PO_4$ crystal vanishes, the leakage of light is almost zero. With this system, the quantity of light leakage was less than 1% of the whole quantity of impinging light 13 when the angle of incidence $\theta$ of the impinging light 13 with respect to the c axis (of the c-plate 3 of the $KD_2PO_4$ crystal) is 30°.

It should here be noted that the $KD_2PO_4$ crystal has such an electro-optical property that it is a monoaxial negative crystal when no voltage is applied thereto while it is a biaxial negative crystal if a voltage is applied. Namely, $KD_2PO_4$ is an optically monoaxial negative crystal (i.e. monoaxial crystal in which the refractive index $n_e$ for extraordinary light is smaller than the refractive index $n_0$ for ordinary light) at room temperatures and has, for light with wavelength $\lambda = 0.546\mu$, $n_0 = 1.51$,
$n_e = 1.47$ and
$\Delta n = 0.041$.

Figure 2:
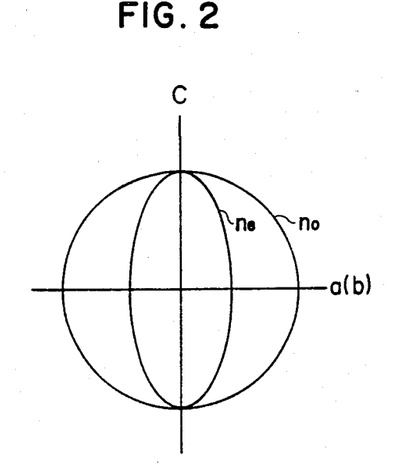
FIG. 2 shows the contour of the ellipsoid of refractive index in the ac plane of the monoaxial negative crystal.
Figure 3:
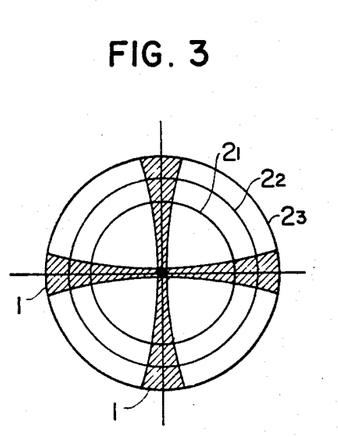
FIG. 3 shows the conoscopic figure of a $KD_2PO_4$ c-plate.

The contour of the ellipsoid in the c-a plane is shown in FIG. 2. By seeing the c-plate of a $KD_2PO_4$ crystal through a polarization microscope is observed a conoscopic figure as shown in FIG. 3. In FIG. 3, the shaded area 1 is the isogyre and the cross point of the shaded area 1 corresponds to the light rays transmitted through the $KD_2PO_4$ crystal along the optical axis (identical with the c axis). The dark area at the center indicates that the refractive difference $\Delta n$ between the double refracted light components is zero. The radially increasing brightness in the diagram of FIG. 3 means, on the other hand, that the refractive difference $\Delta n$ for the light beam impinging upon the crystal plate obliquely with respect to the optical axis is not zero. In general, if a light beam having a wavelength $\lambda$ and a quantity of light $I_0$ is directed into a birefringent crystal having a thickness of $d$ and placed in diagonal relation between a pair of polarizer plates disposed in orthogonal relation to each other, the quantity I of the transmitted light is expressed by the formula $$I = I_0 \sin^2 ([\Delta n \cdot d/\lambda]\pi).$$

Hence, if $\Delta n = 0$, then $I = 0$ and if $n \approx 0$, then $I = 0$, too.

The quantity I of the transmitted light varies with $\Delta n$ and takes the maximum and the minimum values respectively for $\Delta n \cdot d = \lambda/2$ and $\Delta n \cdot d = \lambda$. The locus of the transmitted light corresponding to the minimum value of the quantity I for $\Delta n \cdot d = \lambda$ is the smallest $2_1$ of a family of concentric circles shown in FIG. 3; i.e. the primary dark ring. For $\Delta n \cdot d = 2\lambda$ and $3\lambda$, the quantity I takes the same minimum value and the corresponding loci are the circles $2_2$ and $2_3$, i.e. the secondary and tertially dark rings. With a monoaxial crystal such as $KD_2PO_4$, the retardation $\Gamma = 2\pi/\lambda) \Delta n \cdot d$ increases as the angle of inclination of the incident light to the c axis of the crystal increases, so that a conoscopic figure is observed as an interference figure of light impinging onto the crystal obliquely with respect to the c axis.

White light contains various wavelengths and the interference of each wavelength takes place only for the corresponding angle of incidence, so that the conoscopic figure for white light will be a colored ring of light having the c axis as its center.

If an appropriate dc voltage is applied to the transparent electrodes of $In_2O_3$ coated on the c faces (planes) of a $KD_2PO_4$ crystal, the $KD_2PO_4$ crystal becomes biaxial due to the electro-optical effect induced by the applied voltage. Accordingly, the thus resulted biaxial property gives rise to birefringency even to the light perpendicular to the c axis so that the quantity I of the transmitted light will increase. When the applied dc voltage is 3 KV, $\Gamma = \lambda/2$ with the result that the crystal serves as a quarter-wave plate, the quantity I becoming the maximum. Therefore, by switching the applied voltage $V_a$ over between 0 and 3 KV, the function of an optical shutter can be performed which can turn on and off the perpendicularly impinging light. If in this application the shutter is turned on and off, then the contrast ratio $S/N = I_{max}/I_{min}$ (where $I_{max}$ designates the maximum of the quantity I of the transmitted light and $I_{min}$ the minimum of the same) of the transmitted light will be infinite, i.e. $S/N = \infty$, since $I_{min} = 0$ for the perpendicularly impinging light. However, the contrast ratio S/N for obliquely impinging light does not become infinite, i.e. $S/N \neq \infty$, since in this case $I_{min} \neq 0$, and diminishes with the increase in the angle of incidence. The most serious problem with an optical shutter is the leakage of light in its off state and therefore the light path difference R for incident light in the absence of the applied voltage must be reduced. Namely, the reduction of the dependency of R upon the angle of incidence will result in the increase in the tolerant angle of incidence to the optical switch and therefore make possible the provision of a wide-angled optical switch.

By the way, the property that if an appropriate voltage is applied to a monoaxial crystal the crystal is converted to a biaxial one with its polarity unchanged is not limited to a $KD_2PO_4$ crystal but is common to ordinary monoaxial crystals having a large electro-optical effect.

Embodiment 2

A c-plate having a thickness of 3.2 mm is cut from a $Gd_2(MoO_4)_3$ single crystal and the c faces of the crystal are polished to form a square c-plate of 10 mm × 10 mm having a thickness of 3 mm and the edges of the square c planes parallel to the directions [100] and [010]. Nesa liquid composed mainly of $SnCl_4$ is sprayed onto both the c planes of the square c-plate 3 of a $Gd_2(MoO_4)_3$ crystal heated up to about 500°C and transparent electrodes 7 of $SnO_2$, each having a diameter of 8 mm, are formed on the c planes. The c-plate provided with the transparent electrodes is mounted rigidly on a supporting member 14 shown in FIGS. 4a and 4b.

Figure 4A:
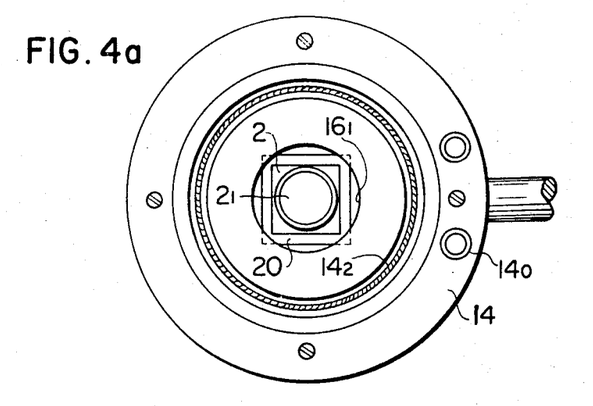
FIGS. 4a and 4b are the front view and the longitudinal cross sectional view of a means for supporting the c-plate of a $Gd_2(MoO_4)_3$ crystal.
Figure 4B:
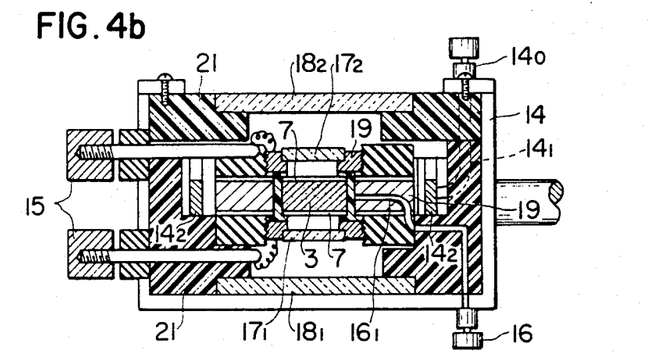

Referring to FIGS. 4a and 4b, there is shown the supporting member 14 comprising a terminal $14_0$, a lead wire $14_1$ connected with the terminal $14_0$, a heater $14_2$ connected with the lead wire $14_1$ for heating the c-plate 3 of $Gd_2(MoO_4)_3$ crystal to 170° ± 1°C, a terminal 15 for a lead wire to apply a voltage to the $Gd_2(MoO_4)_3$ c-plate, a thermocouple $16_1$ having a terminal 16, glass plates $17_1$, $17_2$ and $18_1$, $18_2$ each having parallel planes, a copper block 19, a casing 20 of teflon and a teflon block 21.

In addition, a c-plate is prepared from a $KD_2PO_4$ single crystal by cutting the crystal into a square plate of 30 mm × 30 mm having a thickness of 3 mm and polishing the square plate. The c-plate of $KD_2PO_4$ crystal is then arranged with the $Gd_2(MoO_4)_3$ crystal in such a manner that the directions of the a and b axes of the $KD_2PO_4$ crystal may be identical with those of the $Gd_2(MoO_4)_3$ crystal. Both the $KD_2PO_4$ and $Gd_2(MoO_4)_3$ crystals are placed between a pair of polarizers arranged in orthogonal relationship to each other so as to form a light modulator. With this light modulator, incident light having an angle of incidence of ± 15° and focussed on the $Gd_2(MoO_4)_3$ crystal could be effectively modulated by an ac voltage of 10 KHz having a peak value of about 3 KV. In this case also, as in the previous embodiment, the contrast ratio S/N will be great, i.e. larger than 100. Moreover, if a pressure of 0 to 10 kg/cm² is applied to the $Gd_2(MoO_4)_3$ in the direction of [100] with the electrodes on the c planes short-circuited, the quantity of light can be controlled due to the optoelastic effect induced by the application of stress. The contrast ratio in this case also assumes a great value. In the embodiments 1 and 2 described above, there are explained methods for preventing the leakage of light apt to be caused in case where light is directed obliquely into a system at its off state which system comprises a pair of polarizer plates arranged in orthogonal relation to each other and a monoaxial crystal placed between the polarizers. Even if the electro-optical crystal is not monoaxial but biaxial, there is no need for new artifice. Namely, if the biaxial crystal is optically positive, it should be combined with a biaxial, optically negative crystal but if negative it should be paired with a biaxial, optically positive crystal.

Embodiment 3

Description is now made of an optical switch capable of being turned on and off in response to applied voltages, which comprises a pair of polarizer plates arranged in orthogonal relation to each other and a combination of a λ/4 plate formed of $Gd_2(MoO_4)_3$ c-plate and provided with transparent electrodes and another fixed λ/4 plate, one λ/4 plate being in diagonal relation to another and the combination being placed between the pair of polarizer plates. In this case, the fixed λ/4 plate is made of a biaxial negative crystal which satisfies the conditions defined by the expressions (2) derived above for the purpose of extending the tolerant angle of incidence.

The table given below shows the angle 2V of optical axis, refractive index $n$ and refractive difference $\Delta n$ of the $Gd_2(MoO_4)_3$ c-plate and the corresponding constants of some other biaxial negative crystals which also satisfy nearly the optimum conditions for $Gd_2(MoO_4)_3$.

Table 2

| | V | $n_2$ | $\Delta n_2$ | | $\Delta n_1$ | |
|---|---|---|---|---|---|---|
| $Gd_2(MoO_4)_3$ | (+) 5° | 1.85 | 4.09 | × 10⁻⁴ | 5.3 | × 10⁻² |
| $KNO_3$ | (−) 7° 12' | 1.50 | 4 | × 10⁻⁴ | 17 | × 10⁻² |
| $Ba(OH)_2·8H_2O$ | (−) 8° 33' | 1.50 | 3 | do. | 3 | do. |
| $Na_2ZrSrO_4$ | (−) $S_m$ | 1.79 | 20 | do. | 4.7 | do. |
| $CoSeO_4·6H_2O$ | (−) 7° 13' | 1.52 | 2 | do. | 5 | do. |
| $ZnSO_4$ | (−) $S_m$ | 1.67 | 10 | do. | 1.1 | do. |
| $SrCO_3$ | (−) 7° | 1.66 | 20 | do. | 14.8 | do. |
| $CaCO_3$ | (−) 18° 11' | 1.68 | 45 | do. | 15 | do. |
| $BaCO_3$ | (−) 16° | 1.68 | 10 | do. | 1.4 | do. |
| $PbCO_3$ | (−) 8° 14' | 2.08 | 17 | do. | 20 | do. |

Figure 5:
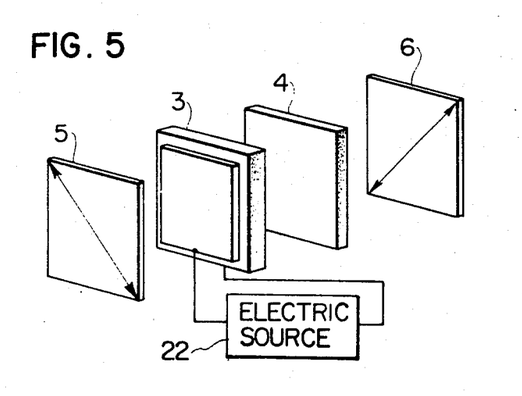
FIG. 5 schematically shows another embodiment of the present invention, in which the optical switch is made of a $PbCO_3$ crystal plate and a $Gd_2(MoO_4)_3$ crystal plate kept at temperatures below its Curie point (i.e. in its ferroelectric phase).

The $PbCO_3$ crystal, selected from those listed in the Table 2, is so cut as to form a λ/4 plate having a thickness of about 95 μ. A combination of the $Gd_2(MoO_4)_3$ (λ/4)-plate 3 and the $PbCO_3$ (λ/4)-plate 4 arranged in diagonal relation to each other is placed between a pair of polarizer plates 5 and 6 arranged in orthogonal relation to each other so as to form an optical element, as shown in FIG. 5. If a voltage is applied from a power source 22 to the $Gd_2(MoO_4)_3$ (λ/4)-plate 3, the algebraical sum of the retardations of both the (λ/4)-plates will be ½ or 0 as a result of domain inversion. Thus, the optical element can serve as an optical shutter to turn on and off the passage of light. In this case, the contrast ratio at the off state is greater than 100 for incident lights having angles of incidence within a range of − 15° to +15°.

The constants of each of the materials listed in the Table 2 are only typical examples and naturally existing compounds have sets of such constants somewhat deviating in value from the enlisted ones. Therefore, the selection of materials for practical application needs the actual measurement of those constants which are optically essential.

Embodiment 4

This embodiment is the application of the optical element according to the last embodiment as the shutter of a camera.

Figure 6:
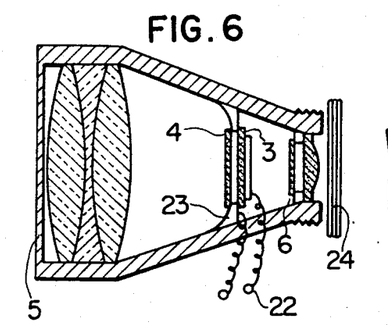
FIG. 6 shows the state of the optical switch of the invention being used as an optical shutter in the lens system of a camera.

Each of the $Gd_2(MoO_4)_3$(λ/4)-plate 3 and the $PbCO_3$ (λ/4)-plate 4 prepared as in the embodiment 3 is shaped into a square of 10 mm × 10 mm and the combination of the square λ/4 plates is mounted in an ordinary 35 mm camera at the position where the diaphragm is to be located in such a manner that the combination may be between parallel disposed polarizers 5 and 6, as indicated at 23 in FIG. 6. The optical shutter device is operated by applying a voltage of 400 V, which is obtained by stepping up the voltage of 9 V from a battery through a miniature step-up transformer, to the device through a lead wire 22. The photosensitive film is exposed to a slight amount of light even if the shutter device is off since there is a little leakage of light in the off-state. In order to prevent the leakage of light in the off-state of the device, a mechanical shutter 24 is additionally provided in rear of the shutter device 23, which shutter 24 is opened only while the shutter release button is depressed.

In this way, the control of the light quantity with an accuracy of less than 10% by error can be performed over a range of shutter speeds 1 to 1/250 second.

Mention should here be made to a conspicuous characteristic which is obtained when the optical shutter device according to the present invention is used in such an apparatus for processing optical images as a camera. The conventional optical shutter employing a birefringent electro-optical crystal not only causes leakage of light even when it is optically shut but also produces vague-outlined pictures when it is open. This is because a light beam impinging obliquely upon the birefringent crystal splits into two components, which follow two different paths through the crystal, so that the resulting image is duplex. On the other hand, according to the present invention, bi-axial, optically positive and negative crystals are paired together so that the retardations due to the birefringency for light impinging in every direction are set off. Accordingly, the resulting image is clean as if through an isotropic crystal. It is therefore necessary here that the polarizers should be arranged in such a manner that their directions of polarization are parallel to each other so as to make the quantity of transmitted light maximum. If the ($\lambda/4$)-plate of $Gd_2(MoO_4)_3$ crystal which is a ferroelectric elastic element is switched, the retardation for the $Gd_2(MoO_4)_3$ ($\lambda/4$)-plate becomes equivalent to that for a ($\lambda/2$)-plate. Therefore, the quantity of transmitted light becomes the minimum and the leakage of light is very small except when the impinging light is extraordinarily oblique.

Thus, it is understood that in order to reduce a leakage of light a material must be employed which has as near conditions as those satisfied by the relations (2). The selection of such a material is very difficult indeed, but a simple method can be substituted therefor, which is described in detail in the next embodiment.

Embodiment 5

Figure 7:
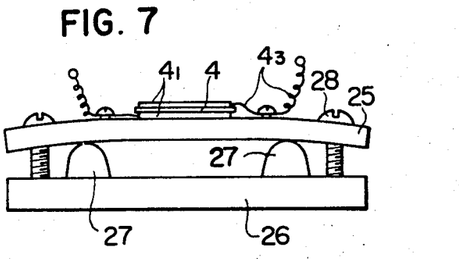
FIG. 7 is a longitudinal cross section of a device for applying a voltage and stress to a $KD_2PO_4$ crystal plate instead of a $PbCO_3$ crystal so as to make the $KD_2PO_4$ crystal biaxial and negative.

A ($\lambda/4$)-plate of $Gd_2(MoO_4)_3$ crystal as an example of biaxial electro-optical crystals is formed which can be switched over by the applied voltage, as in the embodiment 3. A fixed ($\lambda/4$)-plate to be combined with the $Gd_2(MoO_4)_3$ ($\lambda/4$)-plate is a c-plate of $KD_2PO_4$ having a thickness of 0.3 mm instead of a biaxial crystal such as $PbCO_3$ and the fixed ($\lambda/4$)-plate is coated with transparent electrodes as in the embodiment 1. As shown in FIG. 7, a $KD_2PO_4$ ($\lambda/4$)-plate 4 of 10 mm × 10 mm having transparent electrodes $4_1$ thereon is stuck onto an acryl plate 25 of 30 mm × 60 mm having a thickness of 5 mm in the center thereof with epoxy resin in such a manner that the $a$ axis of the $KD_2PO_4$ crystal may be rotated through 45° with respect to the lengthwise direction of the acryl plate. The acryl plate 25 is bent by means of protrusions 27 of a brass base member 26 and threaded bolts 28 so as to create strain in the $KD_2PO_4$ to the extent that the portion of the upper surface near the center of the acryl plate 25 becomes higher by 1 mm than when the plate 25 is flat. Then, a voltage of 500 V is applied between the electrodes $4_1$ through lead wires $4_3$. Consequently, the ($\lambda/4$)-plate of the $KD_2PO_4$ crystal will possess a biaxial property nearly equivalent to the spontaneous birefringency of the $Gd_2(MoO_4)_3$ crystal through the combined effect of the electro-optical phenomenon due to the applied field and the optoelastic one due to the induced strain. The thus fabricated structure is used as an optical shutter device as in the embodiment 3. The theoretically ideal conditions cannot be attained since the small thickness of the crystal makes the fabrication of the device difficult and since the great strain and electric field applied renders the crystal brittle. However, the device has sufficed for the purpose of examining the principle in question. The characteristic of the device can certainly be improved when an appropriate crystal having large electro-optical and optoelastic effects is employed. The above described embodiments have for their main purpose the extension of the angle of incidence in case of an optical shutter device, but it is a matter of course that this principle can be well applied to an optical spacial modulator which comprises a two-dimensional array of optical shutter elements.

The optical space modulators can be grouped into three types, i.e. A type, B type and C type. The A type is a multiple exposure type in which a pair of optical slit elements are arranged in orthogonal relation to each other, each optical slit element comprising a pair of polarizer plates arranged orthogonally to each other and a combination of a ($\lambda/4$)-plate having bond-like transparent electrodes coated thereon with another ($\lambda/4$)-plate, interposed between the pair of polarizer plates. The B type is a single exposure type, according to which a ($\lambda/4$)-plate having band-like transparent electrodes coated thereon is cut along the direction perpendicular to the extension of the electrodes and split up into a plurality of rectangular bars to prevent mechanical cross-talk caused by the crystal deformation due to switching and the matrix that is obtained by wiring the electrodes of the bars in an appropriate manner is placed between a pair of orthogonally disposed polarizers to form an optical space modulator. The constitution of the C type which is a double stage exposure type is as follows. Half-wave plates, i.e. ($\lambda/2$)-plates are used and combined as in the case of the type A. A linearly polarized light beam is directed into the crystal along the crystallographical axis differing by 45° from that of the crystal in case of the type A or B. The interference figure obtained as a result of interference of the light passing through the crystal with the reference light is focussed, without being passed through an analyzer, on one and the same position on the photosensitive medium before and after the writing of information. The types A and B are optical shutter arrays and their operations are fundamentally similar to that of a single optical shutter. Therefore, the arrangements of them adapted for the extended angle of incidence are apparent from the embodiment 3 and specified embodiments need not be considered. Finally, it will be discussed how a wide-angled optical space modulator of double stage exposure type can be realized.

Embodiment 6

A $Gd_2(MoO_4)_3$ crystal is cut along its two opposite c-planes to form a c-cut ($\lambda/2$)-plate. A transparent electrode is coated on one of its two c-planes except one end portion of the c-plane (hereinafter referred to as the first c-plane) while four strips of LiF film are vapor-deposited on the other c-plane (hereinafter referred to as the second c-plane), each stripe having a width of 0.4 mm, extending in the direction of [100], and spaced by 0.6 mm from an adjacent one. Then, Nesa film of SnO₂ is coated on the LiF film kept at a temperature near 520°C and the thus prepared (λ/2)-plate is washed by water to leave the four strips of transparent electrode and the nucleus domains interposed between the stripes of electrodes, having multiple domain structure. A predetermined number of grooves (e.g. three) are cut in the thus completed (λ/2)-plate of Gd₂(MoO₄)₃ crystal, fixed to a supporting plate on a plane, in the direction perpendicular to the stripes of electrodes so that a comb-like structure 3 shown in FIG. 8 may be formed. The grooved recesses of the comb-like structure 3 are packed with a filler and the transparent electrodes are then wired with Cr-Au strips formed through vapor-deposition. Thereafter, the filler is removed to finish a space modulator 3 having component elements in three rows and three columns, which is mounted on a supporting member. If a combination of the thus completed space modulator 3 and a (λ/2)-plate 4 of PbCO₃ crystal arranged in cascade as in the embodiment 3 is inserted in a hologram generating apparatus as shown in FIG. 9, the image produced by the space modulator 3 can be recorded as a hologram on a photosensitive medium.

Figures 8, 9:
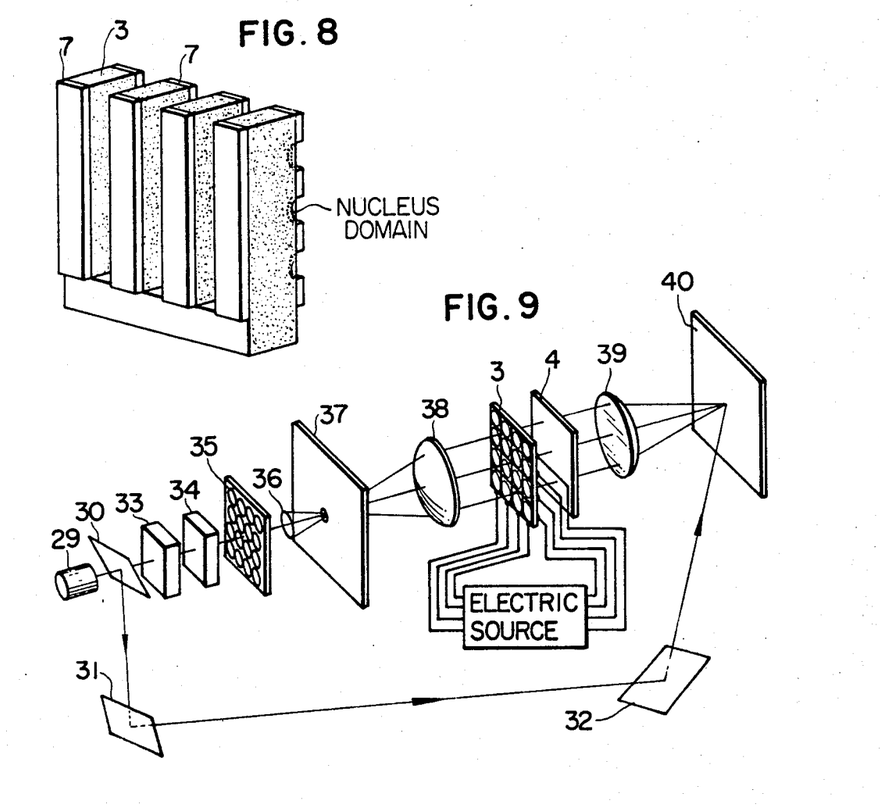
FIG. 8 is a perspective view of a comb-shaped $Gd_2MoO_4)_3$ crystal in its completed form for use in an optical switch (spatial modulator) according to the present invention.
FIG. 9 shows an overall schematic arrangement of an apparatus for making a hologram which apparatus employs an optical switch (spatial modulator) according to the present invention.

In FIG. 9, the hologram generating apparatus comprises a He-Ne laser source 29 having a Brewster window, a beam splitter 30, reflectors 31 and 32, polarizers 33 and 34, a hololens 35, a lens 36, a screen 37 having a small perforation and arranged at the focal point of the lens 36, lenses 38 and 39 and a photosensitive medium 40. The recording of the image produced by the spacial modulator 3 onto the photosensitive medium with the above described hologram generating apparatus is performed as follows. First, a linearly polarized light beam, which oscillates in the direction parallel to the crystallographical axis of the electro-optical crystal constituting the spacial modulator is chosen as an incident light beam and the interference figure produced as a result of interference of the incident light with the reference light is recorded as hologram on the photosensitive medium 40. Secondly, desired information is written in the 4-row, 4-column matrix 3 of the Gd₂(MoO₄)₃ (λ/2)-plate according to the voltage coincidence method and thereafter the information stored in the matrix 3, i.e. spacial modulator, is recorded on the same medium 40 by resuming the irradiation of the laser beam.

In order to write desired information as a hologram in desired addresses on a photosensitive medium (e.g. Kodak 649F film), it is only necessary to shift the incident light impinging upon the spacial modulator 3 by means of polarizers 33 and 34 in front of the modulator 3 so that the light may hit upon the desired addresses and to change the angle of incidence of the light directed into the modulator 3 by means of the hololens 35. In this process, the conventional space modulator has suffered from rapid degradation of the S/N ratio for obliquely impinging lights. The present invention has solved this problem. Namely, according to the present invention, information can be written with a high value of the S/N ratio in addresses of 32 × 32 when the angle of incidence of obliquely impinging light lies in a range of −15° to +15°.

As described above, according to the present invention, the method of providing wide-angled electro-optical elements not only eliminates the leakage of light from an optical shutter and the distortion of formed images but also greatly improves the S/N ratio of a spacial modulator.

What we claim is:

1. An optical switch for use in a spacial modulator, comprising a (λ/4)-plate of c-cut Gd₂(MoO₄)₃ crystal in the shape of a comb having a plurality of digitations extending parallel in the direction of [110] and separated equidistantly from one another;

transparent electrodes disposed on one of the c-planes of said comb-like (λ/4)-plate except on the common portion where said digitations join together;

transparent electrodes disposed on the other c-plane of said comb-like (λ/4)-plate, extending parallel to the direction of [110] and separated equidistantly from one another;

a power source connected with each of both said transparent electrodes; and a (λ/4) plate of biaxial, optically negative crystal arranged in cascade with said (λ/4)-plate of Gd₂(MoO₄)₃ crystal.

2. An optical switch for use in a spacial modulator, comprising a (λ/2)-plate of c-cut Gd₂(MoO₄)₃ crystal in the shape of a comb having a plurality of digitations extending parallel in the direction of [110] and separated equidistantly from one another;

transparent electrodes disposed entirely on one of the c-planes of said comb-like (λ/2) plate except on the common portion where said digitations join together;

transparent electrodes disposed on the other c-plane of said comb-like (λ/2)-plate, extending parallel to the direction of [110] and separated equidistantly from one another;

a power source connected with each of both said transparent electrodes; and a (λ/2) plate of biaxial, optically negative crystal arranged in cascade with said (λ/2) plate of Gd₂(MoO₄)₃ crystal.

3. An optical switch comprising:

an electro-optical crystal plate having two opposite principal planes perpendicular to the c axis of said crystal;

transparent electrodes each disposed on each of said principal planes;

means for applying a voltage to said crystal through said transparent electrodes; and a birefringent crystal plate disposed in cascade with said electro-optical plate;

wherein said electro-optical crystal plate and said birefringent crystal plate are made of biaxial crystals having polarities opposite to each other and having such a mutual relationship that the products of the refractive index and the angle between the optical axes are equal for the respective crystal plates and wherein the products of the thickness and the difference of refractive indices of birefringence are equal for the respective crystal plates.

4. A light control device comprising a pair of polarizers and an optical switch according to claim 3, disposed between said polarizers.

5. An optical switch comprising:
an electro-optical crystal plate having two opposite principal planes perpendicular to the c axis of said crystal;
transparent electrodes each disposed on each of said principal planes;
means for applying a voltage to said crystal through said transparent electrodes; and
a c-plate of $Gd_2(MoO_4)_3$ kept at a constant temperature above 160°C disposed in cascade with said electro-optical plate;
wherein said electro-optical crystal plate and said c-plate are made of uni-axial crystals having polarities opposite to each other and have a mutual relationship expressed by the following formula with respect to the respective thicknesses $d_1$ and $d_2$ of the crystal plates, the refractive indices $n_1$ and $n_2$ and the differences $\Delta n_1$ and $\Delta n_2$ of refractive indices of birefringence:

$$\Delta n_1 d_1 / n_1^2 = \Delta n_2 d_2 / n_2^2$$

6. A light control device comprising a pair of polarizers and an optical switch according to claim 5, disposed between said polarizers.

7. An optical switch comprising:
an electro-optical crystal plate having two opposite principal planes perpendicular to the c axis of said crystal;
transparent electrodes each disposed on each of said principal planes;
means for applying a voltage to said crystal through said transparent electrodes; and
a c-plate of $Gd_2(MoO_4)_3$ kept at a constant temperature above 160°C disposed in cascade with said electro-optical plate;
wherein said electro-optical crystal plate and said c-plate are made of uni-axial crystals having polarities opposite to each other and have the same thickness and a mutual relationship expressed by the following formula with respect to the respective refractive indices $n_1$ and $n_2$ of the crystal plates and the differences $\Delta n_1$ and $\Delta n_2$ of refractive indices of birefringence:

$$\Delta n_1 / n_1^2 = \Delta n_2 / n_2^2 .$$

* * * * *